(12) United States Patent
Roth

(10) Patent No.: US 12,411,008 B1
(45) Date of Patent: Sep. 9, 2025

(54) WALL ART HANGING TOOL

(71) Applicant: Alex Roth, Deerfield Beach, FL (US)

(72) Inventor: Alex Roth, Deerfield Beach, FL (US)

( * ) Notice: Subject to any disclaimer, the term of this patent is extended or adjusted under 35 U.S.C. 154(b) by 379 days.

(21) Appl. No.: 18/200,995

(22) Filed: May 23, 2023

(51) Int. Cl.
  *G01C 9/28* (2006.01)
  *G01C 9/34* (2006.01)

(52) U.S. Cl.
  CPC ....... *G01C 9/28* (2013.01); *G01C 9/34* (2013.01)

(58) Field of Classification Search
  CPC .............. G01B 3/08; G01B 5/24; G01B 5/25
  USPC ........ 33/418, 419, 452, 465, 468, 469, 470, 33/613, 645, 809
  See application file for complete search history.

(56) References Cited

U.S. PATENT DOCUMENTS

| | | | | |
|---|---|---|---|---|
| 3,808,690 A * | 5/1974 | Balder | ................... | G01B 3/08 33/809 |
| 4,152,838 A * | 5/1979 | Cook | ................... | G01C 9/28 D10/69 |
| 4,165,567 A * | 8/1979 | Olsson | ................... | G01B 5/207 33/608 |
| 4,241,510 A * | 12/1980 | Radecki | ................... | G01B 3/02 33/474 |
| 4,392,184 A * | 7/1983 | Hearold | ................... | G01C 9/32 362/120 |
| 4,648,185 A * | 3/1987 | Brandimarte | ........... | B25H 7/04 33/669 |
| 5,357,683 A * | 10/1994 | Trevino | ................... | B25H 7/00 33/528 |
| 5,867,917 A * | 2/1999 | Karon | ................... | A47G 1/205 33/666 |
| 6,029,362 A * | 2/2000 | Miodragovic | ........... | B25H 7/00 33/483 |
| 6,032,378 A * | 3/2000 | Null | ................... | A47G 1/205 33/645 |
| 6,049,991 A * | 4/2000 | Gruenberg | ............ | A47G 1/205 33/485 |
| 6,473,983 B1 * | 11/2002 | Gier | ................... | A47G 1/205 33/613 |
| 6,550,156 B1 * | 4/2003 | Scoville | .................. | F16L 55/18 33/645 |
| 6,684,518 B2 * | 2/2004 | Voorhees | ............... | A47G 1/205 248/495 |
| 6,739,065 B2 * | 5/2004 | Hofmeister | ............ | A47G 1/205 33/666 |
| 6,785,977 B1 * | 9/2004 | Crichton | .................. | G01C 9/00 33/613 |
| 6,944,962 B2 * | 9/2005 | Tessel | ..................... | B44D 3/38 33/414 |
| 6,971,184 B2 * | 12/2005 | Prevost | .................. | A47G 1/205 33/666 |
| 7,155,840 B1 * | 1/2007 | Carbonaro | ............ | A47G 1/205 33/666 |

(Continued)

*Primary Examiner* — George B Bennett
(74) *Attorney, Agent, or Firm* — Sanchelima & Associates, P.A.; Jesus Sanchelima; Christian Sanchelima

(57) ABSTRACT

A wall art hanging tool including a central assembly, a telescopic assembly and a leveling assembly. The central assembly includes a central rod. The telescopic assembly includes a telescopic rod. The telescopic rod is perpendicularly attached to the telescopic rod. The leveling assembly includes eyelets and leveling members attached to the telescopic rod. The leveling members are used to level the telescopic rod. Nails can be introduced into the eyelets to be equidistantly fixed to a wall surface.

10 Claims, 4 Drawing Sheets

(56) References Cited

U.S. PATENT DOCUMENTS

| | | | |
|---|---|---|---|
| 7,316,078 B2 * | 1/2008 | Hagman | A47G 1/205 33/666 |
| 7,814,675 B2 * | 10/2010 | Venderley | A47G 1/205 33/645 |
| 8,672,286 B2 * | 3/2014 | Darre | A47G 1/164 33/666 |
| 8,739,423 B1 * | 6/2014 | Cortum | G01C 9/28 33/613 |
| 8,875,408 B2 * | 11/2014 | Steffensen | G01C 15/06 33/809 |
| 9,032,637 B2 * | 5/2015 | Propp | B25H 7/04 33/669 |
| 9,067,314 B2 * | 6/2015 | Frazer | B25H 7/04 |
| 9,549,624 B2 * | 1/2017 | Parrillo | G01C 9/34 |
| 9,709,393 B2 * | 7/2017 | Oppenheim | G01C 15/02 |
| 9,885,198 B1 * | 2/2018 | Risley | E04H 17/26 |
| 10,149,559 B2 * | 12/2018 | Marks | A47G 1/205 |
| 10,328,667 B2 | 6/2019 | Yanashima | |
| 10,683,670 B1 * | 6/2020 | Rush | E04F 21/18 |
| 10,690,471 B1 * | 6/2020 | DuFaux | G01B 3/08 |
| 11,231,275 B2 * | 1/2022 | Bunting | G01B 3/004 |
| 11,255,651 B2 | 2/2022 | Medina | |
| 11,547,223 B1 * | 1/2023 | Hassett | A47G 1/17 |
| 11,781,850 B1 * | 10/2023 | Marshall | G01B 5/14 33/301 |
| 12,185,851 B2 * | 1/2025 | Cox | A47G 1/205 |
| 2002/0078583 A1 * | 6/2002 | Richardson | A47G 1/205 33/613 |
| 2002/0189119 A1 * | 12/2002 | High | B25H 7/04 33/613 |
| 2003/0029986 A1 * | 2/2003 | Zuller | A47G 1/164 248/476 |
| 2003/0033722 A1 * | 2/2003 | Lanham | G01C 9/26 33/374 |
| 2004/0049936 A1 * | 3/2004 | Newman | G01C 9/28 33/613 |
| 2004/0211074 A1 * | 10/2004 | Tessel | B44D 3/38 33/414 |
| 2016/0097625 A1 * | 4/2016 | Dykes | G01C 9/34 33/760 |

* cited by examiner

WALL ART HANGING TOOL

II. BACKGROUND OF THE INVENTION

1. Field of the Invention

The present invention relates to a wall art hanging tool and, more particularly, to a wall art hanging tool that can be used to install evenly disposed nails at a predetermined height.

2. Description of the Related Art

Several designs for hanging tools have been designed in the past. None of them, however, include telescopic horizontal arms which are extended to place grommets attached thereto at equidistantly distances therebetween.

Applicant believes that a related reference corresponds to U.S. Pat. No. 10,328,667 issued for a picture hanging device with a sliding level mechanism and a pair of wall punch assemblies which are used to drive finish nails into the wall surface. Applicant believes that another related reference corresponds to U.S. Pat. No. 11,255,651 issued for a leveling device that is used to hang picture frames which utilizes a slide ruler assembly with a bubble level and a plurality of pins which are used to mark the mounting locations. None of these references, however, teach of a wall art hanging tool that is comprised of a T-shaped leveling tool with integrated spirit levels and a pair of telescopically adjustable grommets which slide horizontally outwards to mark the locations of the mounting hardware when installing a painting or photograph on a wall surface.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a wall art hanging tool that includes a handle located on a central member of the present invention to ease holding the tool.

It is another object of this invention to provide a wall art hanging tool that includes a rubber portion located on a rear side of the central member to prevent sliding of the present invention when being in abutting contact with a wall surface.

It is still another object of the present invention to provide a wall art hanging tool that includes bubble levels to allow leveling the present invention.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric operational view of the present invention 10.

FIG. 2 shows an isometric view of the present invention 10 in an expanded configuration 10. The present invention 10 includes a central assembly 20, a telescopic assembly 40 and a leveling assembly 60.

V. DETAILED DESCRIPTION OF THE EMBODIMENTS OF THE INVENTION

Figure 1:
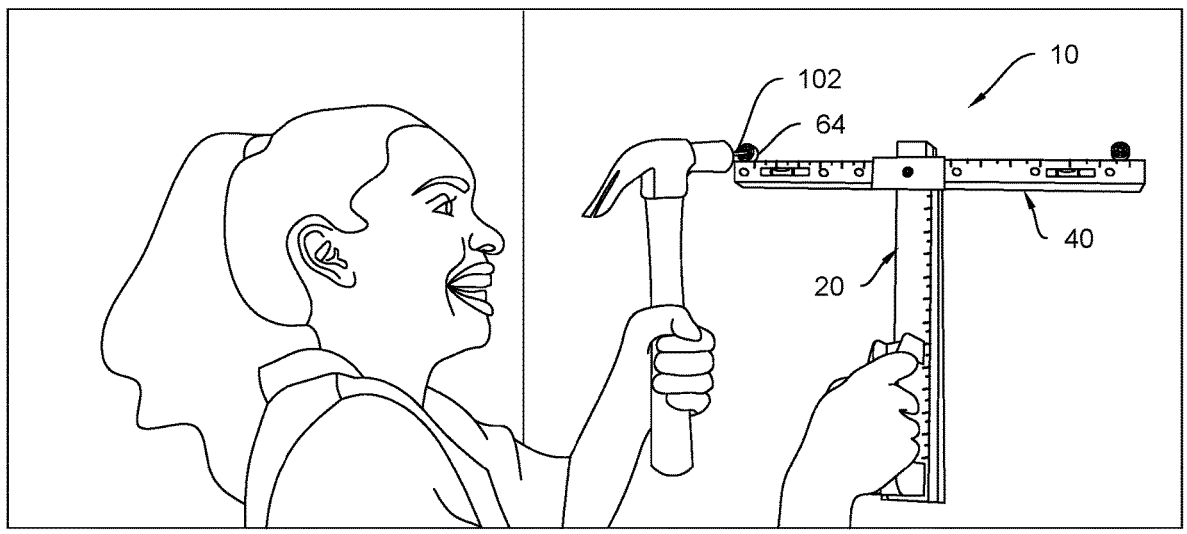

Referring now to the drawings, where the present invention is generally referred to with numeral 10, it can be observed that it basically includes a central assembly 20, a telescopic assembly 40 and a leveling assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The central assembly 20 may include a central member 22, a rubber portion 26, marks 27 and a handle 24. The central member 22 may substantially have a rectangular shape. It also may be suitable for the central member 22 to have a cylindrical shape, a triangular shape, or any other suitable shape. The central member 22 may preferably be made of aluminum. It also may be suitable for the central member 22 to be made of polyurethane, polyvinyl chloride, steel, or any other resistant material. The central member 22 may have the handle 24 in a front portion thereof.

The handle 24 may preferably be made of polyvinyl chloride, polyurethane, or any other resistant material. The handle 24 may substantially have a curved shape. It also may be suitable for the handle 24 to have a rectangular shape, a triangular shape, or any other suitable shape. The handle 24 may have an opening. The handle 24 may be used to handle the present invention 10.

Figure 2:
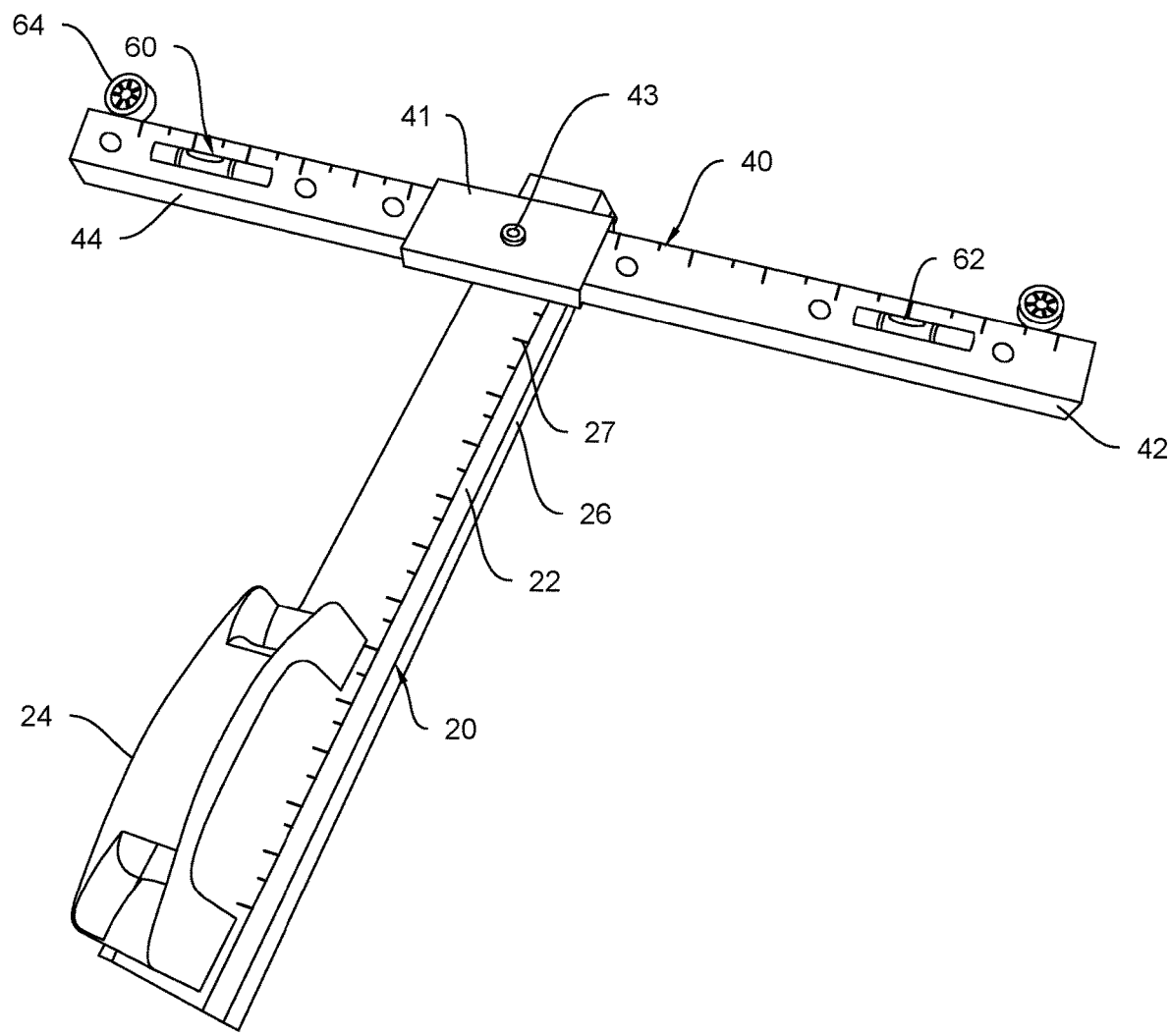

Referring now to FIG. 2 it can be observed that the rubber portion 26 may be located on a rear side of the central member 22. The rubber portion 26 may be made of rubber plastic. The rubber portion 26 may be attached to the rear side of the central member 22 and conform to the shape of the central member 22. The marks 27 may be equidistantly disposed on a length of the central member 22 in such a way that the central member 22 may be used as a ruler.

The telescopic assembly 40 may include a central tube 41, a left tube 44, a pivoting element 43 and a right tube 42. The central tube 41, the left tube 44 and the right tube 42 may substantially have a rectangular shape. It also may be suitable for the central tube 41, the left tube 44 and the right tube 42 to have a cylindrical shape, a triangular shape, or any other suitable shape. The central tube 41 may be hollow. the central tube 41 may be adapted to receive the right tube 42 and the left tube 44. It may be suitable for the central tube 41, the left tube 44 and the right tube 42 to have marks 27 used to measure size. The left tube 44 and the right tube 42 may be selectively inserted into the central tube 41 providing a retracted configuration illustrated in FIG. 3.

Figure 3:
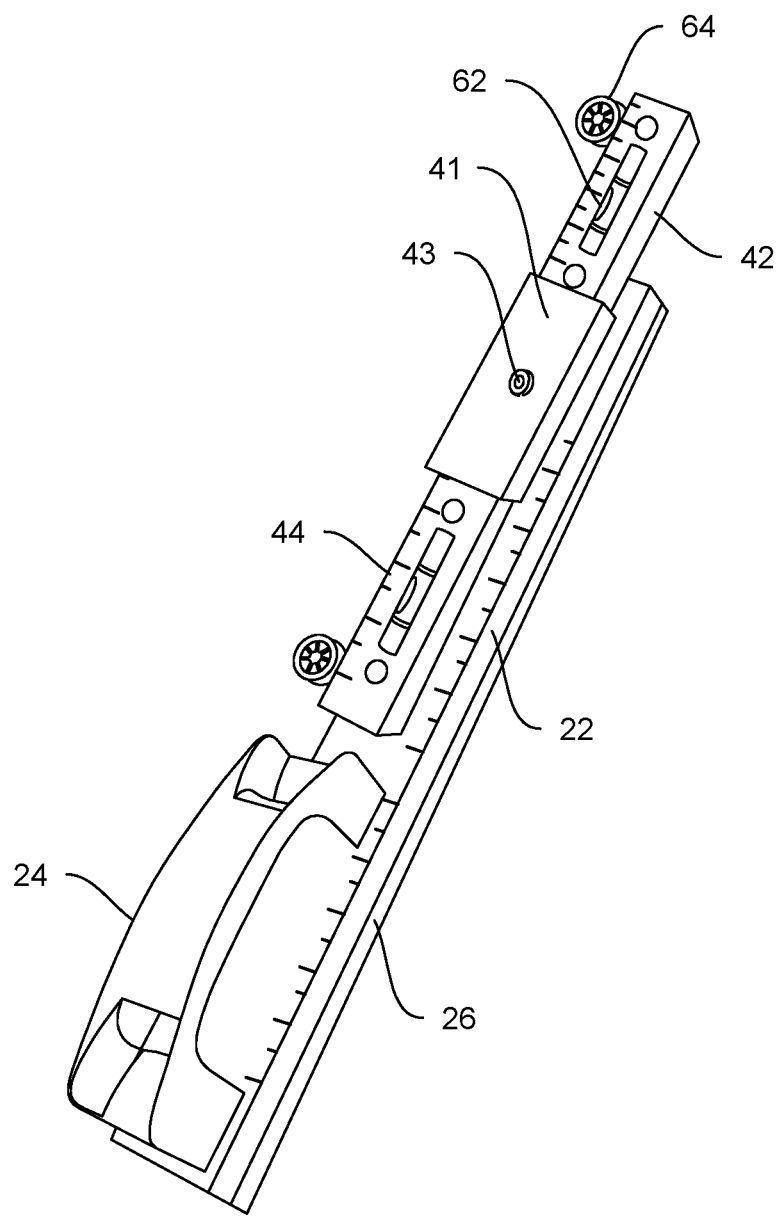
FIG. 3 illustrates an isometric view of the present invention 10 in a retracted configuration.
Figure 4:
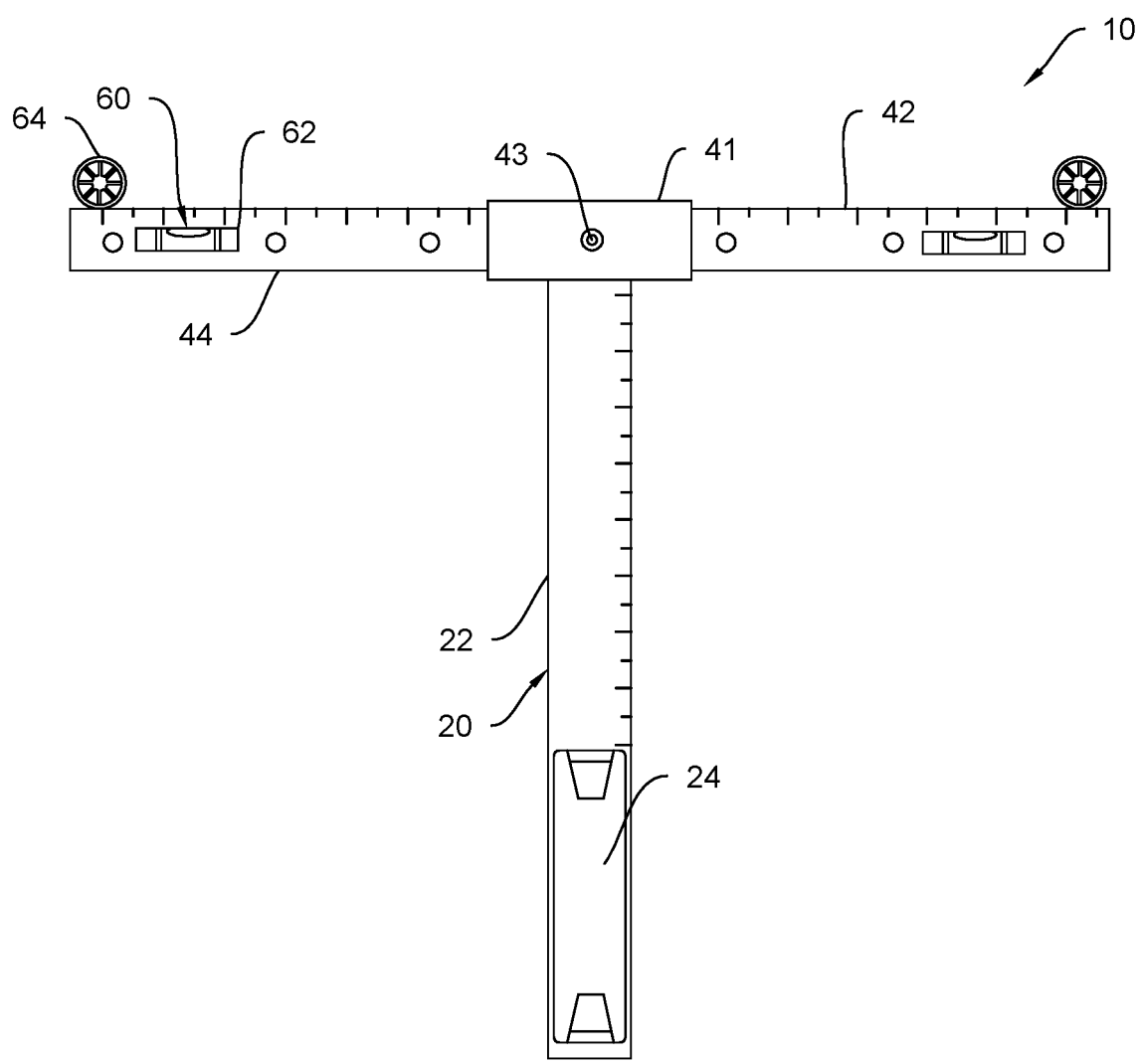
FIG. 4 is a representation of a front view of the present invention 10 in an expanded configuration.

The telescopic assembly 40 may be rotatably attached to the central assembly 20 by means of the pivoting element 43. The pivoting element 43 may be used to selectively rotate the telescopic assembly 40 with respect to the central assembly 20, as best illustrated in FIG. 3. The pivoting element 43 may be located at a central portion of the central tube 41. The pivoting element 43 may be adapted to fix the telescopic assembly 40 in a perpendicular and steady position with respect to the central assembly 20. The telescopic assembly 40 may be rotated parallel to the central member 22 and have the right tube 42 and the left tube 44 inserted into the central tube 41 so that the present invention 10 may be carried as a unique tube piece.

The leveling assembly 60 may include insertion members 64 and leveling members 62. The insertion members 64 may have a circular shape. In a preferred embodiment the insertion members 64 may be silicone grommets having a cross opening in a central portion thereof. It also may be suitable for the insertion members 64 to have a rectangular shape, a triangular shape, or any other suitable shape. In a preferred embodiment the insertion members 64 may be made of silicone. It also may be suitable for the insertion members 64 to be made of polyvinyl chloride, or any other suitable material. The insertion members 64 may be equidistantly attached to a top end of the left tube 44, the central tube 41, and the right tube 42. The insertion members 64 may have an "x" opening to permit fasteners such as nail, screws, drywall anchors to be inserted therethrough and fixed to a wall.

The leveling members 62 may substantially have a cylindrical shape. It also may be suitable for the leveling members 62 to have a rectangular shape, an ovoid shape, or any other suitable shape. In a preferred embodiment the leveling members 62 may be tubular spirit levels. It also may be suitable for the leveling members 62 to be bull's eye spirit levels, an inclinometer, or any other suitable leveling tool known in the prior art. In a preferred embodiment the leveling members 62 may include a first leveling member and a second leveling member. The first leveling member may be located on a first distal end of the left tube 44. The second leveling member may be located on a second distal end of the right tube 42 opposite to the first leveling member. In a preferred embodiment the leveling members 62 are inserted or integrally formed on the right tube 42 and the left tube 42.

In a preferred embodiment illustrated in FIG. 1, the present invention 10 may be placed in an expanded configuration having the telescopic assembly 40 perpendicular to the central assembly 40. In a preferred embodiment the telescopic assembly 40 may be used to measure distance between frame hangers, then fasteners may be introduced through the openings of the insertion member 64 to place the fasteners equidistantly disposed at a predetermined distance. Then, the present invention 10 may be used to place evenly and equidistantly apart nails, providing an evenly an straight disposition thereof.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wall art hanging tool, comprising:
   a central assembly, wherein said central assembly includes a central member;
   a telescopic assembly, wherein said telescopic assembly includes a telescopic member, wherein said telescopic member is perpendicularly connected to said central member; and
   a leveling assembly, wherein said leveling assembly includes insertion members and leveling members attached thereto, wherein said insertion members are equidistantly disposed on said telescopic member, wherein nails are configured to be introduced into said insertion members to be equidistantly fixed to a wall surface.

2. The wall art hanging tool set forth in claim 1, wherein said insertion members are silicone grommets having an x-shaped opening on a central portion thereof.

3. The wall art hanging tool set forth in claim 1, wherein said leveling members are tubular spirit levels.

4. The wall art hanging tool set forth in claim 1, wherein said telescopic member includes a central tube, a right tube and a left tube, wherein said left tube and said right are capable of being selectively introduced into said central tube.

5. The wall art hanging tool set forth in claim 1, wherein said telescopic member includes a pivoting element, wherein said pivoting element is configured to rotatably connect said telescopic assembly with said central member.

6. The wall art hanging tool set forth in claim 1, wherein said central member includes a handle in a front wall thereof.

7. The wall art hanging tool set forth in claim 1, wherein said central member includes a rubber portion on a rear wall thereof.

8. The wall art hanging tool set forth in claim 1, wherein said central member, said left tube and said right have a rectangular shape and are made of aluminum.

9. A wall art hanging tool, comprising:
   a central assembly, wherein said central assembly includes a central member;
   a telescopic assembly, wherein said telescopic assembly includes a telescopic member, wherein said telescopic member includes a central tube, a right tube and a left tube, wherein said central tube is hollow, said central tube is configured to receive said left tube and said right tube therein defining an expanded configuration and a retracted configuration, wherein said left tube and said right tube are inserted into said central tube in said retracted configuration, wherein said central tube is perpendicularly attached to said central member in said expanded configuration, wherein said telescopic member includes a pivoting element, wherein said pivoting element is configured to rotatably attach said central tube to said central member; and
   a leveling assembly, wherein said leveling assembly includes insertion members and leveling members attached thereto, wherein said insertion members are equidistantly disposed on said telescopic member, wherein nails are configured to be introduced into said insertion members to be equidistantly fixed to a wall surface.

10. A wall art hanging tool, consisting of:
    a central assembly, wherein said central assembly includes a central member a handle and a rubber portion, wherein said central member has a rectangular elongated shape, said central member is made of aluminum, wherein said handle is in a front wall of said central member, wherein said rubber portion is located at a rear said of said central member, said central member having a top end;
    a telescopic assembly, wherein said telescopic assembly includes a telescopic member, wherein said telescopic member includes a central tube, a right tube and a left tube, wherein said central tube is hollow, said central tube is configured to receive said left tube and said right tube therein defining an expanded configuration and a retracted configuration, wherein said left tube and said right tube are inserted into said central tube in said retracted configuration, wherein said central tube is perpendicular to said top end of said central member in said expanded configuration, wherein said telescopic member includes a pivoting element, wherein said pivoting element is configured to rotatably attach said central tube to said central member; and a leveling assembly, wherein said leveling assembly includes insertion members and leveling members attached thereto, wherein said insertion members are equidistantly and colinearly disposed on said telescopic member, wherein nails are configured to be introduced into said insertion members to be equidistantly fixed to a wall surface, wherein said leveling members include a first leveling member and a second leveling member, wherein said first leveling member is attached to a first distal end of said left tube, said second leveling member is attached opposite to said first distal end to a second distal end of said right tube, said leveling members are tubular spirit levels.

* * * * *